United States Patent
Nagai et al.

(10) Patent No.: US 9,438,130 B2
(45) Date of Patent: Sep. 6, 2016

(54) SEMICONDUCTOR DEVICE, SWITCHING SYSTEM, AND MATRIX CONVERTER

(71) Applicant: Panasonic Intellectual Property Management Co., Ltd., Osaka (JP)

(72) Inventors: Shuichi Nagai, Osaka (JP); Yasuhiro Yamada, Hyogo (JP); Daisuke Ueda, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 58 days.

(21) Appl. No.: 14/601,592

(22) Filed: Jan. 21, 2015

(65) Prior Publication Data

US 2015/0214853 A1    Jul. 30, 2015

(30) Foreign Application Priority Data

Jan. 29, 2014   (JP) .................................. 2014-014498

(51) Int. Cl.
*H02M 5/293*   (2006.01)
*H02M 5/297*   (2006.01)

(52) U.S. Cl.
CPC ..... *H02M 5/297* (2013.01); *H02M 2005/2932* (2013.01)

(58) Field of Classification Search
CPC .................................................. H02M 5/293
See application file for complete search history.

(56) References Cited

U.S. PATENT DOCUMENTS

| 5,903,034 A | 5/1999 | Sakamoto et al. |
| 2003/0052544 A1* | 3/2003 | Yamamoto ................ B66B 5/02 307/66 |
| 2010/0097105 A1 | 4/2010 | Morita et al. |
| 2011/0215746 A1* | 9/2011 | Ikoshi ..................... H01L 24/06 318/400.27 |
| 2014/0049297 A1 | 2/2014 | Nagai et al. |

FOREIGN PATENT DOCUMENTS

| JP | 59-178821 | 10/1984 |
| JP | 63-274376 | 11/1988 |
| JP | 9-139633 | 5/1997 |
| JP | 2008-067012 | 3/2008 |
| JP | 2009-228397 | 10/2009 |
| WO | 2008/062800 | 5/2008 |
| WO | 2013/065254 | 5/2013 |

* cited by examiner

*Primary Examiner* — Emily P Pham
(74) *Attorney, Agent, or Firm* — McDermott Will & Emery LLP (57) ABSTRACT

A semiconductor device includes a semiconductor switch, a first rectifier circuit, and a second rectifier circuit. The semiconductor switch, the first rectifier circuit, and the second rectifier circuit are integrated on a common board. On the board, a first output terminal of the first rectifier circuit is coupled to a first gate terminal of the semiconductor switch, and a first output reference terminal of the first rectifier circuit is coupled to a first source terminal of the semiconductor switch. On the board, a second output terminal of the second rectifier circuit is coupled to a second gate terminal of the semiconductor switch, and a second output reference terminal of the second rectifier circuit is coupled to a second source terminal of the semiconductor switch.

15 Claims, 8 Drawing Sheets

SEMICONDUCTOR DEVICE, SWITCHING SYSTEM, AND MATRIX CONVERTER

CROSS REFERENCES TO RELATED APPLICATIONS

This application claims priority to Japanese Patent Application No. 2014-014498, filed on Jan. 29, 2014, the contents of which are hereby incorporated by reference.

BACKGROUND

1. Technical Field

The present disclosure relates to, for example, a semiconductor device, a switching system, and a matrix converter.

2. Description of the Related Art

A gate drive circuit applies a gate voltage to a gate terminal of a semiconductor switch and performs on-off control of the semiconductor switch. The gate drive circuit applies the gate voltage to the gate terminal of the semiconductor switch, which has high withstand voltage characteristics.

Japanese Patent No. 5552230 discloses a bidirectional switch for which a gallium nitride (GaN) semiconductor is used. The bidirectional switch may allow current to flow in both directions between two terminals when turned on, and may interrupt the bidirectional current when turned off.

An element that insulates a direct current (DC) component between a primary side and a secondary side is referred to as a signal insulator or a non-contact signal transmitter. The signal insulator is indispensable to drive the semiconductor switch with high withstand voltage characteristics.

Japanese Unexamined Patent Application Publication No. 2008-067012 discloses an open-ring type electromagnetic resonance coupler capable of isolatedly transmitting a gate signal and power.

SUMMARY

One non-limiting and exemplary embodiment provides a semiconductor device with high noise resistance.

Additional benefits and advantages of the disclosed embodiments will be apparent from the specification and drawings. The benefits and/or advantages may be individually provided by the various embodiments and features of the specification and drawings disclosure, and need not all be provided in order to obtain one or more of the same.

A semiconductor device according to an aspect of the present disclosure includes: a semiconductor switch that includes a first source terminal, a second source terminal, a first gate terminal, and a second gate terminal; a first rectifier circuit that rectifies a first high-frequency signal to generate a first output signal and outputs the first output signal, the first rectifier circuit including a first input terminal from which the first high-frequency signal is input, a first input reference terminal, a first output terminal from which the first output signal is output, and a first output reference terminal coupled with the first input reference terminal at an equal potential; and a second rectifier circuit that rectifies a second high-frequency signal to generate a second output signal, the second rectifier circuit including a second input terminal from which the second high-frequency signal is input, a second input reference terminal, a second output terminal from which the second output signal is output, and a second output reference terminal coupled with the second input reference terminal at an equal potential. In the semiconductor device, the semiconductor switch, the first rectifier circuit, and the second rectifier circuit are integrated on a common board. On the board, the first output terminal of the first rectifier circuit is coupled to the first gate terminal of the semiconductor switch, and the first output reference terminal of the first rectifier circuit is coupled to the first source terminal of the semiconductor switch. On the board, the second output terminal of the second rectifier circuit is coupled to the second gate terminal of the semiconductor switch, and the second output reference terminal of the second rectifier circuit is coupled to the second source terminal of the semiconductor switch.

DETAILED DESCRIPTION

Overview of Embodiments

A semiconductor device according to an aspect of the present disclosure includes: a semiconductor switch that includes a first source terminal, a second source terminal, a first gate terminal, and a second gate terminal; a first rectifier circuit that rectifies a first high-frequency signal to generate a first output signal and outputs the first output signal, the first rectifier circuit including a first input terminal from which the first high-frequency signal is input, a first input reference terminal, a first output terminal from which the first output signal is output, and a first output reference terminal coupled with the first input reference terminal at an equal potential; and a second rectifier circuit that rectifies a second high-frequency signal to generate a second output signal, the second rectifier circuit including a second input terminal from which the second high-frequency signal is input, a second input reference terminal, a second output terminal from which the second output signal is output, and a second output reference terminal coupled with the second input reference terminal at an equal potential. In the semiconductor device, the semiconductor switch, the first rectifier circuit, and the second rectifier circuit are integrated on a common board. On the board, the first output terminal of the first rectifier circuit is coupled to the first gate terminal of the semiconductor switch, and the first output reference terminal of the first rectifier circuit is coupled to the first source terminal of the semiconductor switch. On the board, the second output terminal of the second rectifier circuit is coupled to the second gate terminal of the semiconductor switch, and the second output reference terminal of the second rectifier circuit is coupled to the second source terminal of the semiconductor switch.

Since the semiconductor device configured as described above operates according to a high-frequency signal, noise resistance be enhanced. In addition, since the semiconductor device is driven at a high frequency and the elements of the semiconductor device are integrated, transmission losses and signal delays can be reduced. The semiconductor device can be downsized as a result of the integration.

In a semiconductor device according to an aspect of the present disclosure, for example, the semiconductor switch may be a bidirectional switch in which conduction between the first source terminal and the second source terminal is controlled according to the first output signal input to the first gate terminal and the second output signal input to the second gate terminal.

In a semiconductor device according to an aspect of the present disclosure, for example, the first input reference terminal and the second input reference terminal may be insulated from each other.

Since the reference terminal of the first rectifier circuit and the reference terminal of the second rectifier circuit are isolated in the configuration, the semiconductor switch can be driven in a simplified circuit.

In a semiconductor device according to an aspect of the present disclosure, for example, the board may include a nitride semiconductor layer, and the semiconductor switch, the first rectifier circuit, and the second rectifier circuit may be integrated on the nitride semiconductor layer.

The integration of the semiconductor device on a nitride semiconductor layer can enhance thermal resistance. Accordingly, even when the thermal density increases because of the integration, stable operation can be performed.

In a semiconductor device according to an aspect of the present disclosure, for example, the semiconductor device may be a horizontal device.

Since the semiconductor device is a horizontal device, integration can become easy while enabling downsizing. The horizontal device implies that the first source terminal, the second source terminal, the first gate terminal, and the second gate terminal are provided to only one of a pair of main surfaces of the board.

In a semiconductor device according to an aspect of the present disclosure, for example, the first rectifier circuit may include a first coupling capacitor, a first inductor, and a first diode, and the second rectifier circuit includes a second coupling capacitor, a second inductor, and a second diode.

A rectifier circuit including a diode has high conversion efficiency for a high frequency and can easily be downsized. A rectifier circuit including an inductor can be resistant to noise because the rectifier circuit including an inductor has frequency characteristics.

In a semiconductor device according to an aspect of the present disclosure, for example, a cathode of the first diode may be coupled to the first input terminal, an anode of the first diode may be coupled to the first input reference terminal, a cathode of the second diode may be coupled to the second input terminal, and an anode of the second diode may be coupled to the second input reference terminal.

In a semiconductor device according to an aspect of the present disclosure, for example, the first rectifier circuit may further include a first capacitor and a first resistor coupled parallel to each other between the first output terminal and the first output reference terminal, and the second rectifier circuit may further include a second capacitor and a second resistor coupled parallel to each other between the second output terminal and the second output reference terminal.

A rectifier circuit including a resistor can turn off a semiconductor switch at high speed.

In a semiconductor device according to an aspect of the present disclosure, for example, an inductance of the first inductor and an inductance of the second inductor may be different from each other.

In a semiconductor device according to an aspect of the present disclosure, for example, a frequency of the first high-frequency signal and a frequency of the second high-frequency signal may be different from each other.

In the above-described configuration, the operational frequencies of the first rectifier circuit and the second rectifier circuit are different from each other. Accordingly, interference of each high-frequency signal may be suppressed. For example, even when the integration of the semiconductor device is implemented in a small region, misoperation caused by interference of each high-frequency signal may be prevented.

In a semiconductor device according to an aspect of the present disclosure, for example, the semiconductor switch may be a first bidirectional switch; the semiconductor device may further include a second bidirectional switch that includes a third source terminal, a fourth source terminal, a third gate terminal, and a fourth gate terminal, a third bidirectional switch that includes a fifth source terminal, a sixth source terminal, a fifth gate terminal, and a sixth gate terminal, a third rectifier circuit that is coupled to the third source terminal and the third gate terminal of the second bidirectional switch, a fourth rectifier circuit that is coupled to the fourth source terminal and the fourth gate terminal of the second bidirectional switch, a fifth rectifier circuit that is coupled to the fifth source terminal and the fifth gate terminal of the third bidirectional switch, and a sixth rectifier circuit that is coupled to the sixth source terminal and the sixth gate terminal of the third bidirectional switch; and the first bidirectional switch, the second bidirectional switch, the third bidirectional switch, the first rectifier circuit, the second rectifier circuit, the third rectifier circuit, the fourth rectifier circuit, the fifth rectifier circuit, and the sixth rectifier circuit may be integrated on the board.

Since a plurality of bidirectional switches are integrated, wiring among the plurality of bidirectional switches can be simplified while enabling downsizing. In addition, assembly cost can be reduced. Shortening wiring distances can reduce signal delays.

For example, a semiconductor device according to an aspect of the present disclosure may further include a common coupling section that connects with one of the first source terminal and the second source terminal of the first bidirectional switch, one of the third source terminal and the fourth source terminal of the second bidirectional switch, and one of the fifth source terminal and the sixth source terminal of the third bidirectional switch. In the semiconductor device, the first rectifier circuit, the second rectifier circuit, the third rectifier circuit, the fourth rectifier circuit, the fifth rectifier circuit, and the sixth rectifier circuit may be integrated in a rectifier-circuit region on the board, and the first bidirectional switch and the second bidirectional switch may be arranged side by side across the common coupling section, and the third bidirectional switch and the rectifier-circuit region may be arranged side by side across the common coupling section.

Since in the above-described configuration, the rectifier circuits and the plurality of bidirectional switches are arranged in different regions, interference may not occur therebetween, and thereby stable operation can be possible. Further, the semiconductor device can be downsized.

For example, a switching system according to an aspect of the present disclosure may include: the above-described semiconductor device; a transmission circuit that modulates a high frequency wave according to an input signal to generate a high-frequency signal, and outputs the high-frequency signal; and a resonance coupler that isolatedly transmits the high-frequency signal input from the transmission circuit while dividing the high-frequency signal into a first high-frequency signal and a second high-frequency signal, and outputs the first and second high-frequency signals to the semiconductor device.

For example, a matrix converter according to an aspect of the present disclosure may include: at least nine semiconductor devices including the above-described semiconductor device; an integrated transmission circuit into which at least three transmission circuits are integrated, each of the at least three transmission circuits modulating a high frequency wave according to an input signal to generate a high-frequency signal; and an integrated insulator into which at least nine resonance couplers are integrated, each of the at least nine resonance couplers isolatedly transmitting the high-frequency signal input from the transmission circuit to output a first high-frequency signal and a second high-frequency signal to the semiconductor device. In the matrix converter, the at least nine semiconductor devices may be driven according to at least nine input signals input to the integrated transmission circuit.

In a matrix converter according to an aspect of the present disclosure, for example, each of the at least three transmission circuits may generate three high-frequency signals based on three input signals, each of the at least nine resonance couplers may divide one high-frequency signal input from the integrated transmission circuit into two high-frequency signals and output the two high-frequency signals, and each of the at least nine semiconductor devices may be driven according to two high-frequency signals input from the integrated insulator.

According to the above-described configuration, 18 output signals with reference voltages that are different from one another can be generated from three input signals. Further, the integration of each circuit can reduce insulation gate wiring and simplify a system.

Embodiments are described in detail below with reference to the drawings.

The embodiments described below are comprehensive or specific examples. The values, shapes, materials, constituents, arrangement positions and coupling forms of the constituents, steps, order of the steps, and the like specified in the below-described embodiments are examples and are not intended to limit the present disclosure. Among the constituents in the embodiments below, the constituents not mentioned in independent claims that indicate the most significant concepts are described as arbitrary constituents.

In the description of all the drawings below, the same reference numerals are given to the same or similar parts and overlapping explanation may be omitted.

[Underlying Knowledge Forming Basis of This Disclosure]

Viewpoints of the inventors of the present disclosure are described.

A bidirectional switch is used in, for example, a matrix converter. The matrix converter is a power conversion circuit, which directly converts alternating current (AC) power into AC power with a different amplitude or a different frequency. In the matrix converter, the bidirectional switches are arranged like a matrix.

Figure 9:
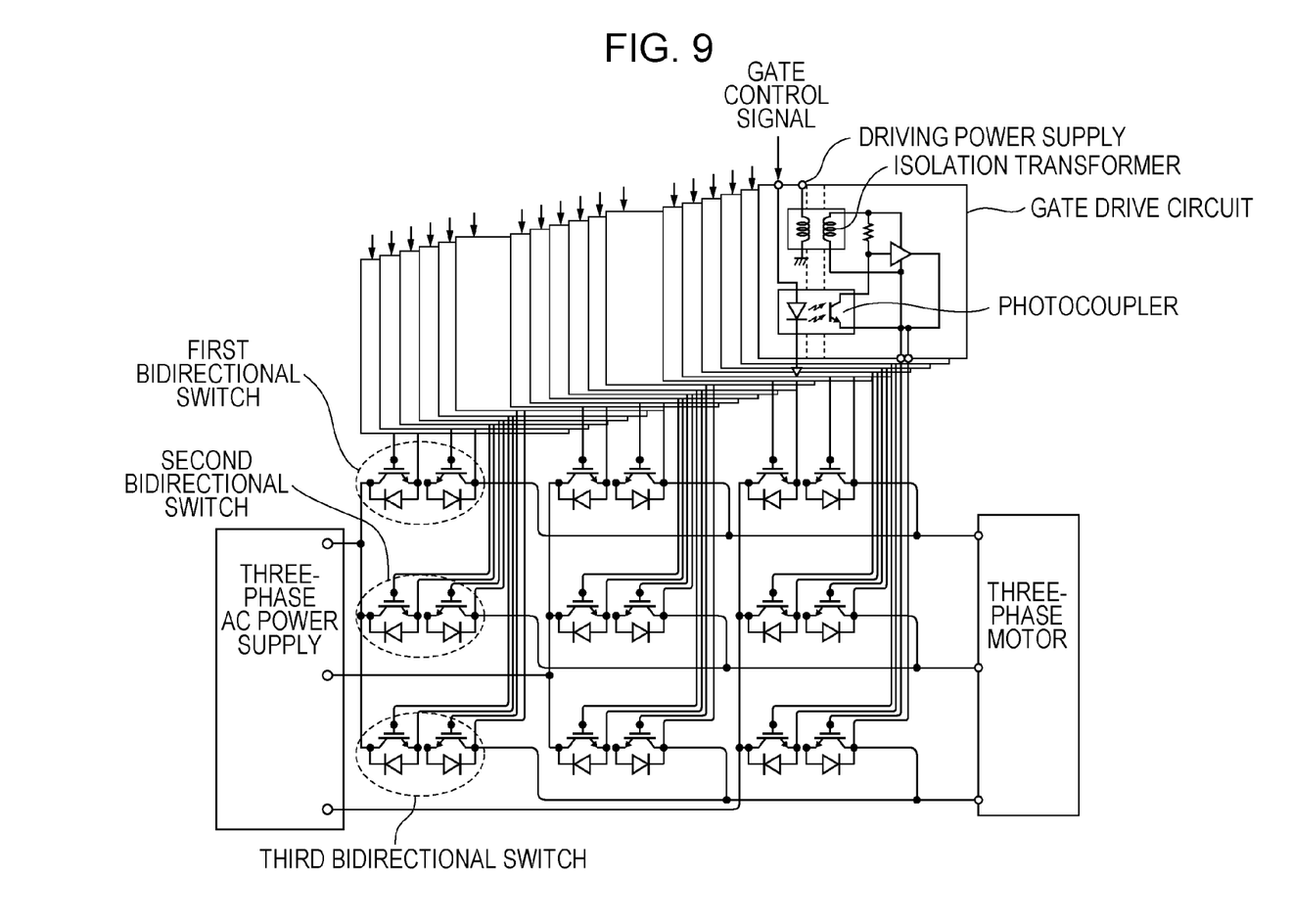
FIG. 9 is a block diagram, which illustrates a configuration of a conventional three-phase matrix converter for AC to AC conversion.

FIG. 9 illustrates a three-phase AC matrix converter system. The AC matrix converter illustrated in FIG. 9 is made up of nine bidirectional switches and 18 gate drive circuits. Each of the gate drive circuits includes an isolation transformer and a photocoupler. The AC matrix converter illustrated in FIG. 9 can generate an AC from a three-phase AC power supply, and thereby rotate a three-phase motor.

The bidirectional switch includes two gate terminals and two source terminals. For the on-off control of the bidirectional switch, for example, a positive gate voltage is applied to each of the source terminals. In the circuit in which the bidirectional switch is arranged, a potential of each source varies. Thus, each source is set in a floating state, where the source is insulated from other potentials in a direct current (DC) manner. That is, because of a DC component, a secondary side of the gate drive circuit, from which a drive signal is output to a semiconductor switch, is insulated, in a DC manner, from a primary side of the gate drive circuit to which an input signal is input.

The conventional power conversion circuit has many elements, and thereby a complicated wiring configuration. In particular, the matrix converter includes a lot of gate control wiring.

The increase in wiring may raise assembly cost. Besides, since a lot of wiring is arranged while ensuring high withstand voltage characteristics, the wiring occupies a large region. If the wiring causes a delay, operation may become unstable. For the reasons, when the elements that configure the matrix converter are integrated, a small-sized and stable matrix converter can be obtained at low cost.

The conversion efficiency of the power conversion circuit can be enhanced by causing a semiconductor switch included in the power conversion circuit to operate at high speed. In this case, low-frequency noise, that is, in-phase signal noise, or common-mode noise, transmitted through the ground may matter. The noise negatively effects the semiconductor switch driven with a DC voltage. In contrast, the in-phase signal noise can be suppressed by decreasing the capacitance of an insulator. In this case, a gate signal with a low frequency can also be interrupted.

Thus, the present inventors have conceived the present disclosure after consideration of a semiconductor device, which is inexpensive, small-sized, and resistant to noise.

Embodiments

[Configuration]

Figure 1:
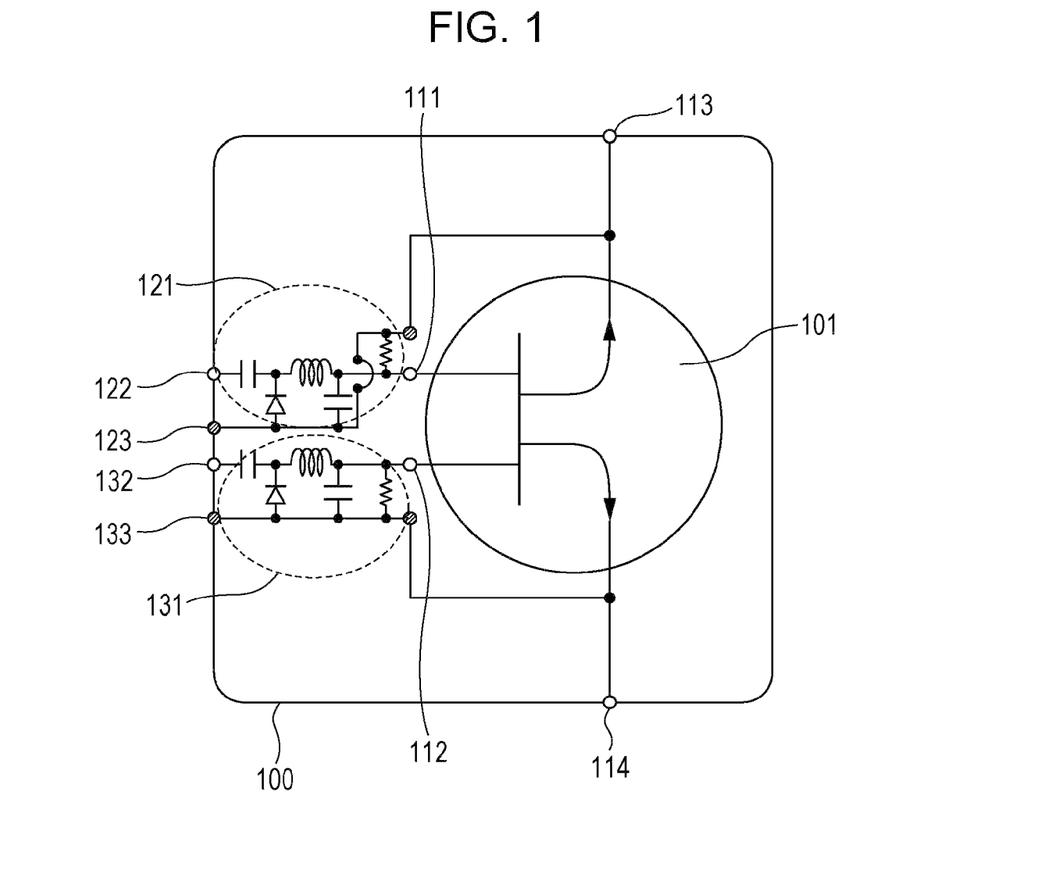
FIG. 1 is a block circuit diagram, which illustrates a configuration example of a semiconductor device according to an embodiment.

An example of a semiconductor device according to an embodiment of the present disclosure is described below with reference to the drawings. FIG. 1 is a block circuit diagram, which illustrates a configuration example of a semiconductor device 100. The semiconductor device 100 is a power device driven by a high-frequency signal. The high frequency denotes, for example, a frequency in a range from 1 MHz to 100 GHz inclusive. For example, the high frequency is 5 GHz. The semiconductor device 100 is turned on or off, depending on the high-frequency signal input therein.

The semiconductor device 100 in FIG. 1 includes a first bidirectional switch 101, a first rectifier circuit 121, and a second rectifier circuit 131. The first bidirectional switch 101 is an example of a semiconductor switch. The first rectifier circuit 121 and the second rectifier circuit 131 each rectify a high frequency.

The first rectifier circuit 121 includes a first input terminal 122, a first input reference terminal 123, a first output terminal 129, and a first output reference terminal 130. The second rectifier circuit 131 includes a second input terminal 132, a second input reference terminal 133, a second output terminal 139, and a second output reference terminal 140. The first bidirectional switch 101 includes a first source terminal 113, a second source terminal 114, a first gate terminal 111, and a second gate terminal 112. The first gate terminal 111 is coupled to the first output terminal 129 of the first rectifier circuit 121. The second gate terminal 112 is coupled to the second output terminal 139 of the second rectifier circuit 131. The first source terminal 113 is coupled to the first output reference terminal 130 of the first rectifier circuit 121. The second source terminal 114 is coupled to the second output reference terminal 140 of the second rectifier circuit 131. The first input reference terminal 123 and the first output reference terminal 130 are at an equal potential. The second input reference terminal 133 and the second output reference terminal 140 are at an equal potential. The first input reference terminal 123 and the second input reference terminal 133 are insulated. For example, a gallium nitride (GaN) semiconductor is used for the first bidirectional switch 101.

Figure 2:
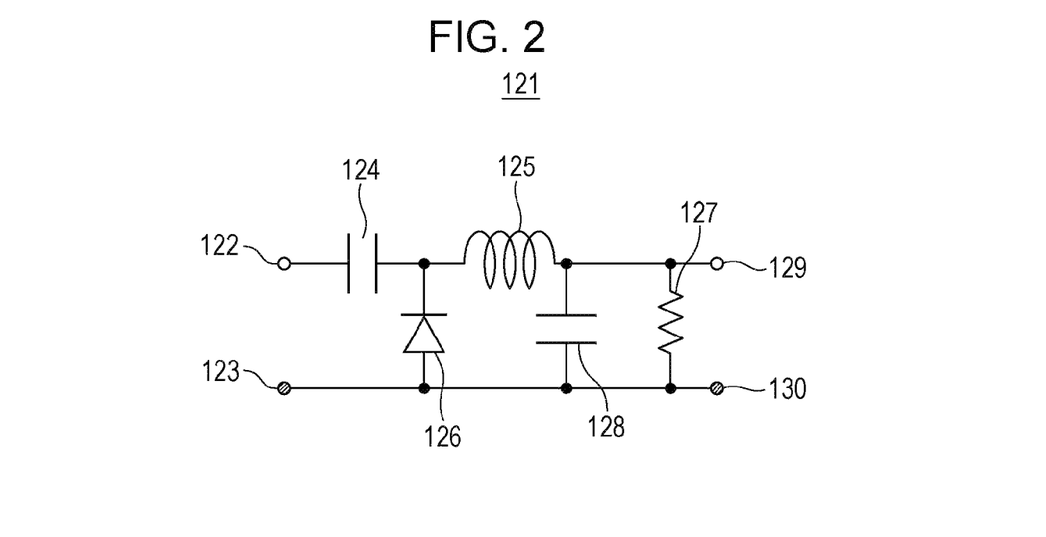
FIG. 2 is a circuit diagram, which illustrates a configuration example of a first rectifier circuit according to an embodiment.

A specific example of the first rectifier circuit 121 is described with reference to the circuit diagram in FIG. 2.

The first rectifier circuit 121 includes the first input terminal 122, the first input reference terminal 123, the first output terminal 129, and the first output reference terminal 130. For example, the first rectifier circuit 121 includes a first diode 126, a first coupling capacitor 124, a first inductor 125, a first capacitor 128, and a first resistor 127. The first output terminal 129 is coupled to the first gate terminal 111 of the first bidirectional switch 101. The first output reference terminal 130 is coupled to the first source terminal 113 of the first bidirectional switch 101.

The first coupling capacitor 124 and the first inductor 125 are coupled in series between the first input terminal 122 and the first output terminal 129. The first diode 126 is coupled between a coupling point of the first coupling capacitor 124 and the first inductor 125 and the first input reference terminal 123. An anode of the first diode 126 is coupled to the first input reference terminal 123.

The first capacitor 128 is coupled between the first output terminal 129 and the first output reference terminal 130. The first resistor 127 is coupled between the first output terminal 129 and the first output reference terminal 130. The second rectifier circuit 131 has the same circuit configuration as the circuit configuration of the first rectifier circuit 121.

The capacitance of the first coupling capacitor 124 is, for example, 0.4 pF. The inductance of the first inductor 125 is, for example, 1.6 nH. The capacitance of the first capacitor 128 is, for example, 10 pF. The resistance value of the first resistor 127 is, for example, 500 Ω. The first diode 126 is, for example, a Schottky barrier diode with a junction capacitance of 1.5 pF.

[Operation]

An example of operation of the semiconductor device 100 is now described. The semiconductor device 100 operates according to an input of a high-frequency signal with a frequency of, for example, 5 GHz.

When a high-frequency signal is input to the first input terminal 122, the first rectifier circuit 121 causes a positive voltage based on the first output reference terminal 130 to be generated at the first output terminal 129, depending on the strength of the high-frequency signal. Accordingly, a gate voltage applied to the first gate terminal 111 is a positive voltage with respect to the the first source terminal 113. As a result, the first bidirectional switch 101 is turned on on the side of the first source terminal 113.

When a high-frequency signal is input to the second input terminal 132, the second rectifier circuit 131 causes a positive voltage based on the second output reference terminal 140 to be generated at the second output terminal 139, depending on the strength of the high-frequency signal. Accordingly, a gate voltage applied to the second gate terminal 112 is a positive voltage with respect to the the second source terminal 114. As a result, the first bidirectional switch 101 is turned on on the side of the second source terminal 114.

When a high-frequency signal is input to both the first rectifier circuit 121 and the second rectifier circuit 131, the first gate terminal 111 and the second gate terminal 112 are turned on, to enter the conductive state. Consequently, current flows between the first source terminal 113 and the second source terminal 114.

In the first bidirectional switch 101 in the conductive state, current flows in the direction from the first source terminal 113 toward the second source terminal 114 or the direction from the second source terminal 114 toward the first source terminal 113.

When no high-frequency signal is input to the first input terminal 122, no power is generated in the first rectifier circuit 121. Thus, the first gate terminal 111 and the first source terminal 113 of the first bidirectional switch 101 are short-circuited through the first resistor 127. Consequently, the first gate terminal 111 in the first bidirectional switch 101 is turned off.

When no high-frequency signal is input to the second input terminal 132, no power is generated in the second rectifier circuit 131. Thus, the second gate terminal 112 and the second source terminal 114 of the first bidirectional switch 101 are short-circuited through the second resistor 127. Consequently, the second gate terminal 112 in the first bidirectional switch 101 is turned off.

When a high-frequency signal is input to neither the first rectifier circuit 121 nor the second rectifier circuit 131, the first gate terminal 111 and the second gate terminal 112 are in the OFF state, that is, the insulated state. Consequently, no current flows between the first source terminal 113 and the second source terminal 114.

In the first rectifier circuit 121, the line length of the first inductor 125 amounts to, for example, approximately one fourth of a wavelength into which an operational frequency is converted. At this time, the first rectifier circuit 121 generates a voltage dependent on a high-frequency signal, which is within a certain frequency band, such as a frequency band of 5 GHz. The first rectifier circuit 121 and the second rectifier circuit 131 may rectify another certain high frequency.

[Advantages]

The semiconductor device 100 operates, depending on the presence or absence of a high-frequency signal, or whether the level of a high-frequency signal is high or low. Thus, the semiconductor device 100 can be resistant to low-frequency noise, and thus can perform stable switching operation.

Each of the first rectifier circuit 121 and the second rectifier circuit 131 has frequency characteristics and thus operates only at a certain frequency. Therefore, when the semiconductor device includes a plurality of rectifier circuits, the operational frequencies of the rectifier circuits may be made different from one another. In this case, interference among the plurality of rectifier circuits may be prevented. In particular in a semiconductor device into which semiconductor switches are integrated, misoperation caused by interference may be prevented.

The semiconductor device 100 is driven according to a high-frequency signal. Thus, for example, an insulator may be coupled to the first input terminal 122 and/or the second input terminal 132 of the semiconductor device 100. In this case, the high-frequency signal may pass through the insulator even when the coupling capacitance of the insulator is small. As a result, a device including the semiconductor device 100 and the insulator can achieve a high common-mode suppression ratio.

When the semiconductor device 100 includes a nitride semiconductor layer, the thermal resistance of the semiconductor device 100 can be raised. Thus, the first rectifier circuit 121, the second rectifier circuit 131, and the first bidirectional switch 101 may be integrated in a smaller area. As a result, the semiconductor device 100 can be downsized.

The semiconductor device 100 may be designed so that a distance from the first rectifier circuit 121 to the first gate terminal 111 and a distance from the second rectifier circuit 131 to the second gate terminal 112 are short. Accordingly, wiring inductance may be reduced and thus the first bidirectional switch 101 may operate at high speed.

When the bidirectional switch and the gate drive circuits are coupled through a wire, a delay may occur between a signal input to the first gate terminal of the bidirectional switch and a signal input to the second gate terminal of the bidirectional switch. Accordingly, two gates of the bidirectional switch may fail to be turned on at the same time, and thus switching characteristics may be impaired. Besides, a transmission loss may occur when a high-frequency signal is transmitted through the wire.

In contrast, in the semiconductor device 100, delays caused by wiring can be reduced because the first rectifier circuit 121, the second rectifier circuit 131, and the first bidirectional switch 101 are integrated. Accordingly, the characteristics of the first bidirectional switch 101 can be enhanced. Further, transmission losses can be reduced because of no passage through the wire.

The first rectifier circuit 121 and the second rectifier circuit 131 are designed so as to operate at high frequencies. Thus, the size of the circuit may be made smaller.

Since the threshold voltage of a gate of a nitride semiconductor switch is typically low, misoperation may be caused by external noise. On the other hand, when the semiconductor device 100 has the rectifier circuits rectifying a high frequency signal at the fore stage of the gate of the nitride semiconductor switch, the semiconductor device 100 can have high resistance to noise.

The high frequency may be a frequency other than 5 GHz, such as a frequency between a few MHz and 100 GHz.

A high-frequency signal input to the first input terminal 122 and a high-frequency signal input to the second input terminal 132 may have frequencies different from each other. The strength of the high-frequency signal input to the first input terminal 122 and the strength of the high-frequency signal input to the second input terminal 132 may be different from each other. In that case, the resistance between the first source terminal 113 and the second source terminal 114 may be set so as to be different, depending on the current direction. For example, the semiconductor switch may be set so as to have diode characteristics.

It is optional for the first rectifier circuit 121 to include the first capacitor 128. In this case, the gate capacitance of the first bidirectional switch 101 may be used instead. It is optional for the first rectifier circuit 121 to include the first resistor 127. When the first rectifier circuit 121 includes the first resistor 127, the first bidirectional switch 101 may be turned off at high speed by removing electric charge of the gate. The second rectifier circuit 131 may also employ a similar configuration.

Capacitors may be coupled in series between the first input reference terminal 123 and the first diode 126, and/or between the second input reference terminal 133 and a second diode.

The first bidirectional switch 101 is an example of the semiconductor switch according to the present disclosure. The semiconductor switch may be a power switching device with a single gate, which has no bidirectional characteristics.

The first bidirectional switch 101 may be, for example, a GaN semiconductor or another semiconductor.

The first rectifier circuit 121 and the second rectifier circuit 131 may have the same circuit configuration or have different circuit configurations.

An antenna, which receives a high-frequency wave, may be coupled to the first input terminal 122 of the first rectifier circuit 121 or the second input terminal 132 of the second rectifier circuit 131.

[Integration]

An example of the integration of the semiconductor device according to the present embodiment is described.

Figure 3:
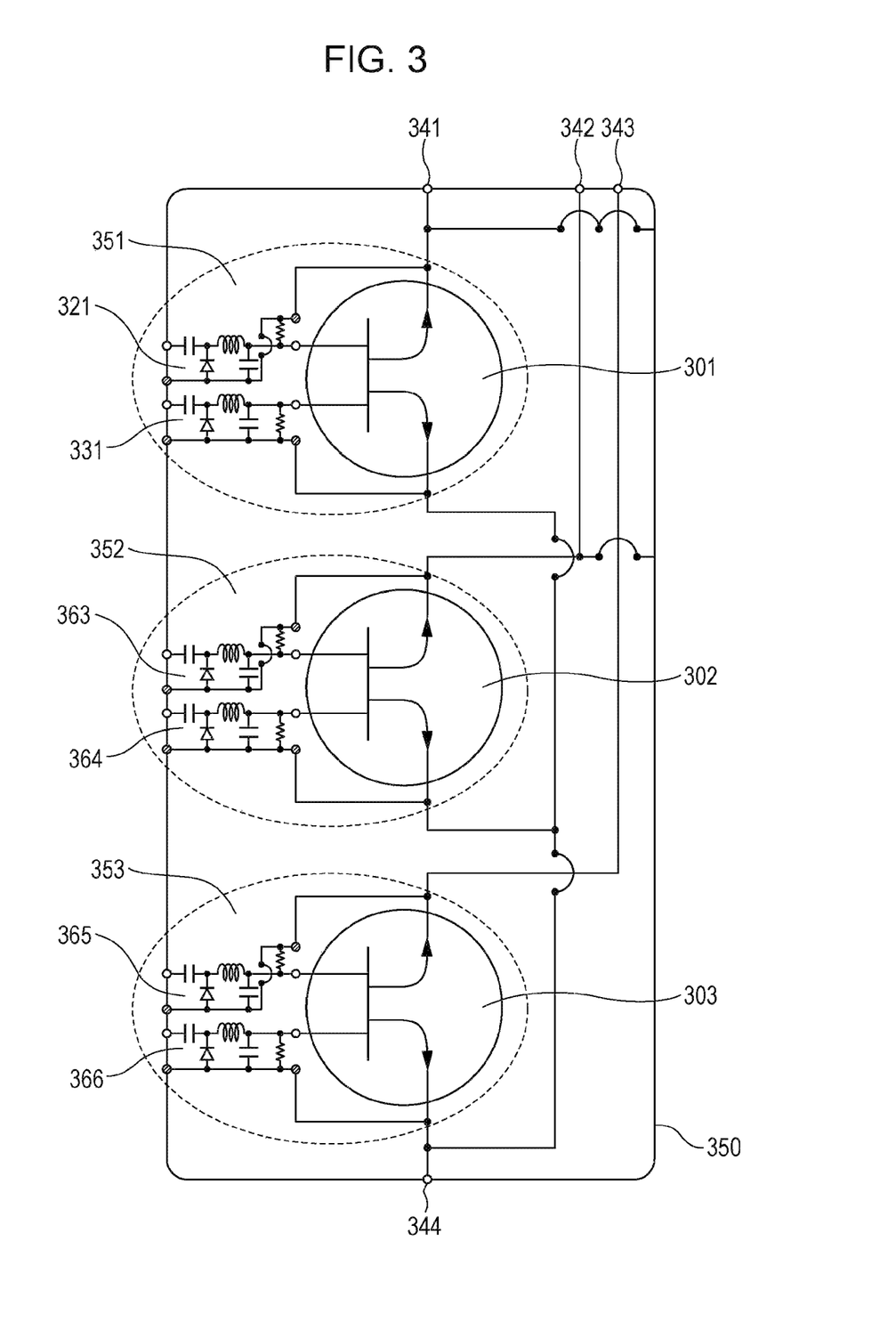
FIG. 3 is a block circuit diagram, which illustrates a configuration example of an integrated semiconductor device according to an embodiment.

FIG. 3 is a block circuit diagram, which illustrates an example of an integrated semiconductor device 350. The integrated semiconductor device 350 is used for, for example, a matrix converter. The integrated semiconductor device 350 is an example of the semiconductor device according to the present disclosure.

A first semiconductor device 351, a second semiconductor device 352, and a third semiconductor device 353 are integrated into the integrated semiconductor device 350. The first semiconductor device 351 includes a first rectifier circuit 321, a second rectifier circuit 331, and a first bidirectional switch 301. The second semiconductor device 352 includes a third rectifier circuit 363, and a fourth rectifier circuit 364, and a second bidirectional switch 302. The third semiconductor device 353 includes a fifth rectifier circuit 365, a sixth rectifier circuit 366, and a third bidirectional switch 303. The integrated semiconductor device 350 includes a first terminal 341, a second terminal 342, a third terminal 343, and a fourth terminal 344.

While one of source terminals of the first semiconductor device 351 is coupled to the fourth terminal 344, the other source terminal of the first semiconductor device 351 is coupled to the first terminal 341. While one of source terminals of the second semiconductor device 352 is coupled to the fourth terminal 344, the other source terminal of the second semiconductor device 352 is coupled to the second terminal 342. While one of source terminals of the third semiconductor device 353 is coupled to the fourth terminal 344, the other source terminal of the third semiconductor device 353 is coupled to the third terminal 343.

The first bidirectional switch 301, the second bidirectional switch 302, and the third bidirectional switch 303 are, for example, horizontal devices, such as nitride semiconductors.

Figure 7:
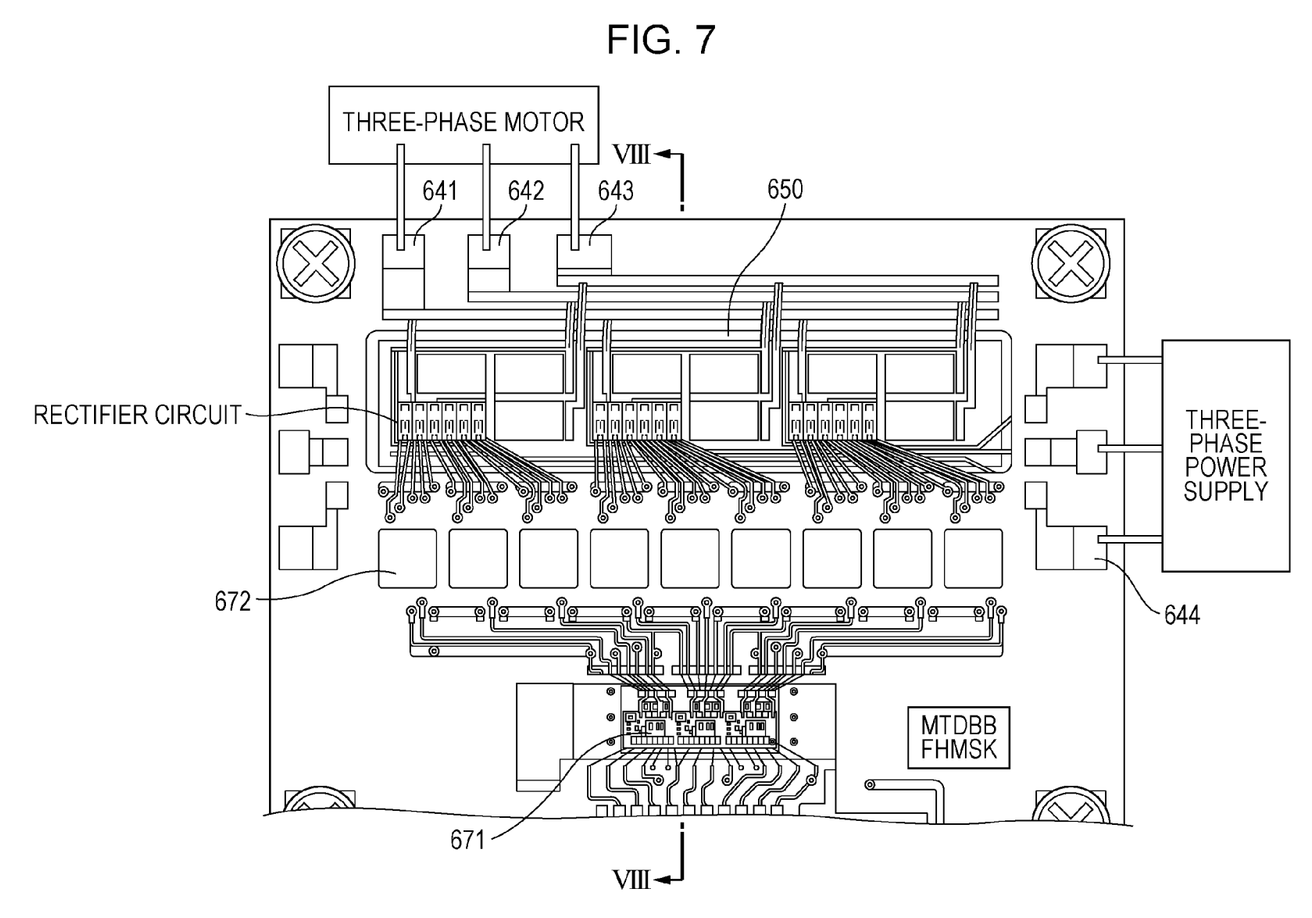
FIG. 7 is a top view, which illustrates a specific example of a three-phase AC matrix converter system according to an embodiment.

Three units of the integrated semiconductor device 350 may be combined. The combination may bring a 3×3 matrix converter, for example, as illustrated in FIG. 7. In this case, for example, the first terminals 341 are coupled to one another, the second terminals 342 are coupled to one another, and the third terminals 343 are coupled to one another.

The three integrated semiconductor devices 350 may be integrated into one chip. In other words, nine bidirectional switches and 18 rectifier circuits may be integrated into one chip.

The integrated semiconductor device 350 may cause fewer signal delays between elements. Accordingly, each bidirectional switch may exhibit preferable characteristics. In addition, the integrated semiconductor device 350 may be more downsized than a conventional device because the gate wiring and the like are shortened.

The integrated semiconductor device 350 is formed, for example, in a nitride semiconductor. Thus, operation may be properly operated even when the integration of the semiconductor switches increases the heating density.

Figure 4:
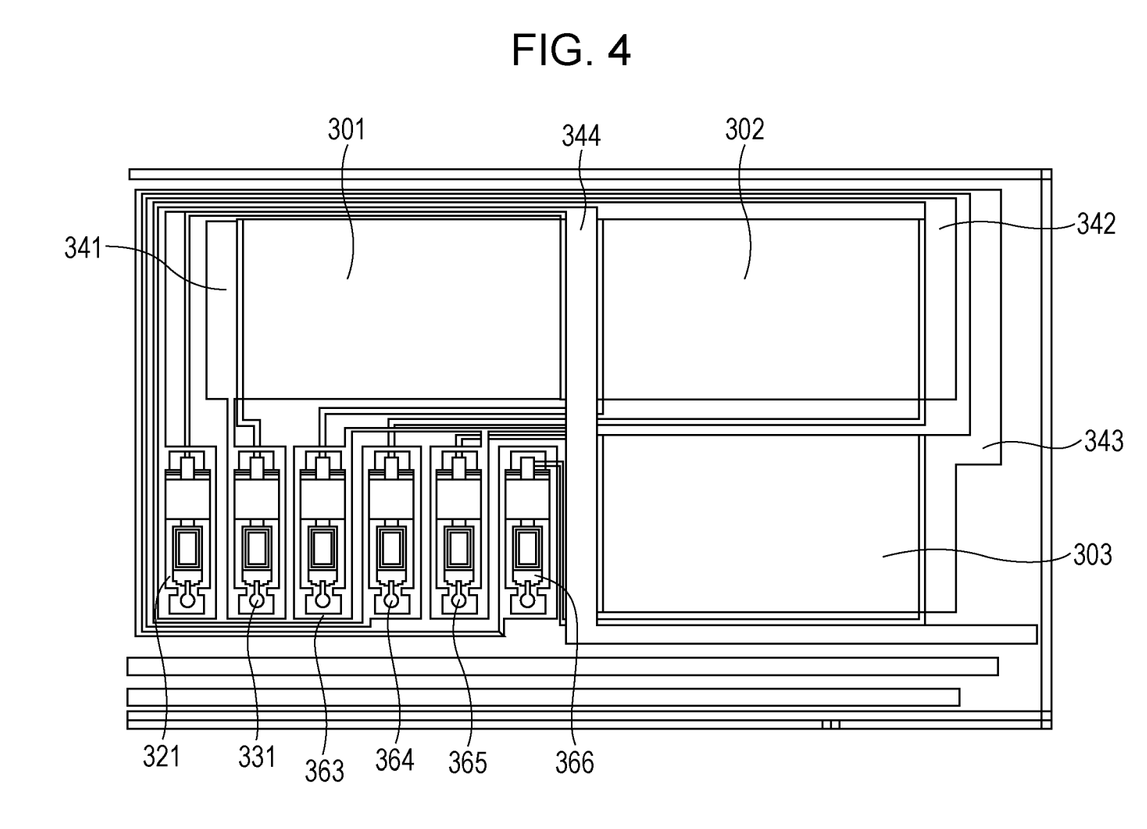
FIG. 4 is a plane layout view, which illustrates a specific example of an integrated semiconductor device according to an embodiment.

FIG. 4 illustrates an example of a plane layout of the integrated semiconductor device 350 in FIG. 3.

The integrated semiconductor device 350 includes the first bidirectional switch 301, the second bidirectional switch 302, the third bidirectional switch 303, the first rectifier circuit 321, the second rectifier circuit 331, the third rectifier circuit 363, the fourth rectifier circuit 364, the fifth rectifier circuit 365, the sixth rectifier circuit 366, the first terminal 341, the second terminal 342, the third terminal 343, and the fourth terminal 344. The fourth terminal 344 is an example of a "common coupling section" according to the present disclosure.

The fourth terminal 344 may be positioned at a smallest distance from each of the first bidirectional switch 301, the second bidirectional switch 302, and the third bidirectional switch 303.

Specifically, the first bidirectional switch 301 and the second bidirectional switch 302 may be arranged side by side across the fourth terminal 344. The third bidirectional switch 303 and the region in which the rectifier circuits are integrated are arranged side by side across the fourth terminal 344.

When wirings cross in three dimensions, the amount of clearance therebetween determines the high withstand voltage characteristics. Thus, two source wirings of the first bidirectional switch 301, two source wirings of the second bidirectional switch 302, two source wirings of the third bidirectional switch 303 are arranged so as not to overlap one another. Because of the arrangement illustrated in FIG. 4, the integrated semiconductor device 350 can have short wiring lengths, and can be downsized while gaining high withstand voltage characteristics.

[Operation]

Figure 5:
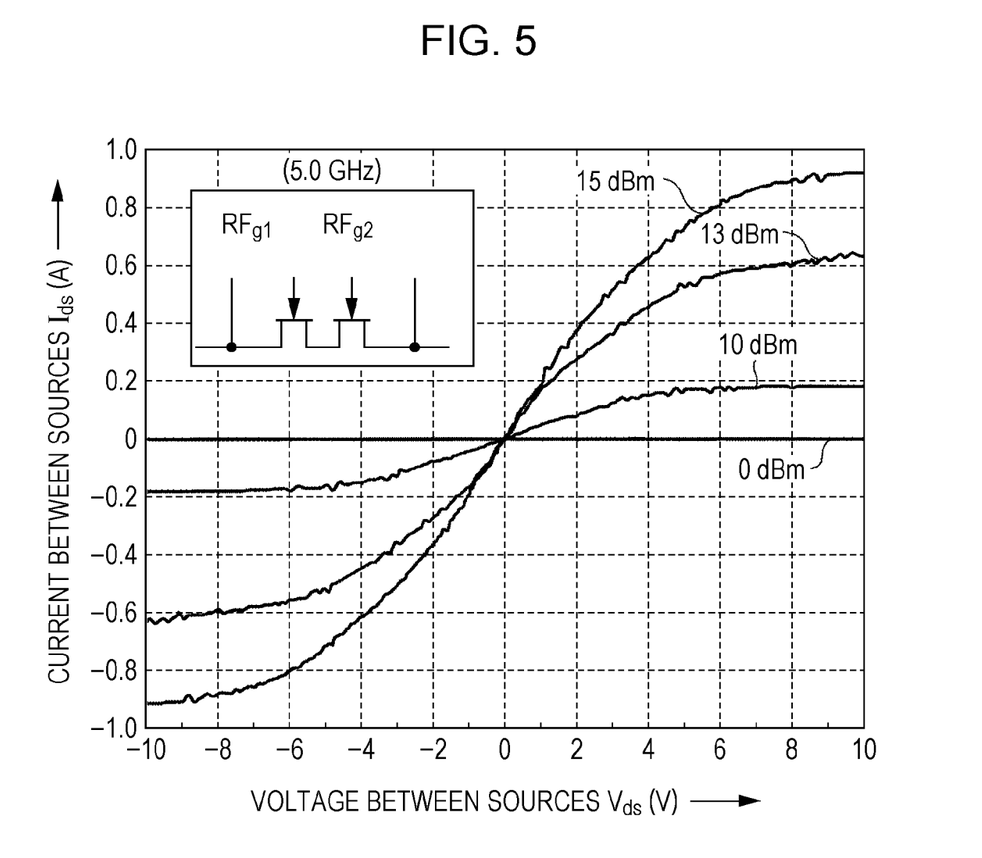
FIG. 5 is a characteristic graph, which illustrates an example of operation of a semiconductor device according to an embodiment.

FIG. 5 illustrates characteristics based on the operation example of the semiconductor device 100.

The horizontal axis in FIG. 5 indicates voltage applied between the first source terminal 113 and the second source terminal 114. The vertical axis in FIG. 5 indicates current flowing between the first source terminal 113 and the second source terminal 114. FIG. 5 illustrates volt-ampere characteristics of the cases in which high-frequency signals of 5 GHz are input to the first input terminal 122 and the second input terminal 132 at the signal strengths of 0 dBm, 10 dBm, 13 dBm, and 15 dBm.

When the strength of the high-frequency signal is 0 dBm, no current flows between the first source terminal 113 and the second source terminal 114, and this state corresponds to the OFF state of the semiconductor device 100. The resistance between the first source terminal 113 and the second source terminal 114 decreases as the strength of the high-frequency signal increases, and current flows between the first source terminal 113 and the second source terminal 114. This state corresponds to the ON state of the semiconductor device 100.

The results in FIG. 5 indicate that when the semiconductor device 100 is in the ON state, current flows in both directions without depending on the polarity of the voltage between the first source terminal 113 and the second source terminal 114.

[Matrix Converter]

Figure 6:
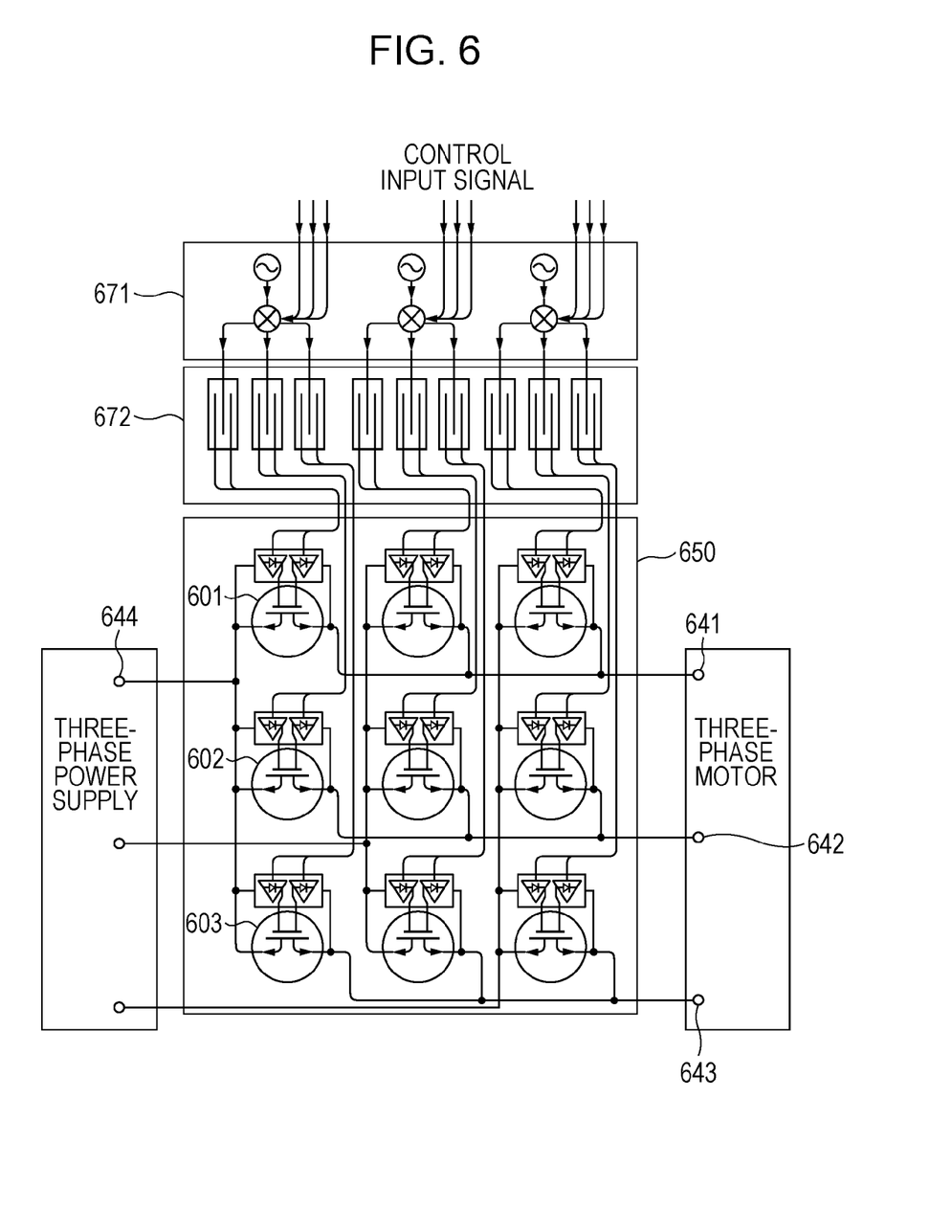
FIG. 6 is a block configuration diagram, which illustrates a configuration example of a three-phase alternating current (AC) matrix converter system according to an embodiment.

FIG. 6 illustrates an example of a three-phase AC matrix converter system including the semiconductor device according to the present embodiment.

The three-phase AC matrix converter system illustrated in FIG. 6 is made up of an integrated transmission circuit 671, an integrated insulator 672, and an integrated semiconductor device 650. The integrated transmission circuit 671 transmits high-frequency signals for gate driving. The integrated insulator 672 isolatedly transmits high-frequency signals. For example, resonance couplers are integrated into the integrated insulator 672. The semiconductor devices according to the embodiment are integrated into the integrated semiconductor device 650.

The integrated transmission circuit 671 outputs nine high-frequency signals. For example, the integrated transmission circuit 671 includes three transmission circuits. For example, each of the transmission circuits generates three high-frequency signals dependent on three input signals. The integrated insulator 672 is made up of, for example, nine electromagnetic resonance couplers. Each of the electromagnetic resonance couplers receives one high-frequency signal and then outputs two high-frequency signals. The integrated semiconductor device 650 is made up of nine bidirectional switches, which include a first bidirectional switch 601, a second bidirectional switch 602, and a third bidirectional switch 603, and 18 rectifier circuits. The above-described configuration can make the matrix converter very small in size.

Figure 8:
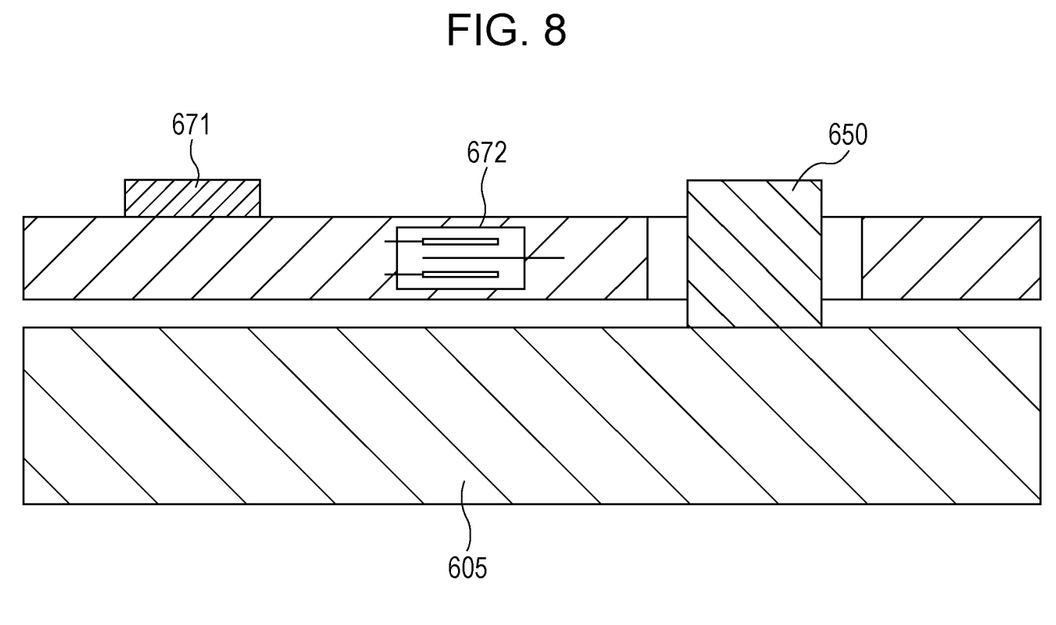
FIG. 8 is a cross-sectional view along line VIII-VIII in FIG. 7.

FIG. 7 is a top view, which illustrates a specific example of the three-phase AC matrix converter system illustrated in FIG. 6. FIG. 8 is a cross-sectional schematic diagram along line VIII-VIII in FIG. 7.

The three-phase AC matrix converter illustrated in FIG. 7 includes a first terminal 641, a second terminal 642, a third terminal 643, and a fourth terminal 644. The first terminal 641, the second terminal 642, and the third terminal 643 are coupled to a three-phase motor. The fourth terminal 644 is coupled to a three-phase power supply. A printed board is arranged over a heat sink 605. The integrated insulator 672 is arranged in the printed board. The integrated transmission circuit 671 is mounted on the printed board. A hole is formed through part of the printed board toward the heat sink 605. The integrated semiconductor device 650 is arranged in the hole and is contact with the heat sink 605. The integrated insulator 672 is arranged between the integrated semiconductor device 650 and the integrated transmission circuit 671.

Since the above-described arrangement may divide a region into a high-frequency region and a low-frequency region, a matrix converter system, which stably operates, may be obtained.

For example, the integrated transmission circuit 671 may be arranged over the integrated insulator 672.

The semiconductor device according to the present embodiment may be used for another matrix converter, or a power conversion device. The power conversion device may be, for example, a two-phase to three-phase conversion system, a single-phase to three-phase conversion system, or a two-phase to two-phase conversion system.

The present disclosure is not limited to the embodiment described above or variations thereof. An embodiment in which various changes that those skilled in the art may hit upon are added to the above-described embodiments and the variations thereof, and another embodiment in which a constituent of a different embodiment or the variations thereof is combined are also included in the scope of the present disclosure as long as these embodiments fall within the true spirit of the present disclosure.

For example, the present disclosure may be utilized for a power converter, such as a matrix converter, or a power system.

What is claimed is:

1. A semiconductor device comprising:
 a semiconductor switch that includes a first source terminal, a second source terminal, a first gate terminal, and a second gate terminal;
 a first rectifier circuit that rectifies a first high-frequency signal to generate a first output signal and outputs the first output signal, the first rectifier circuit including a first input terminal from which the first high-frequency signal is input, a first input reference terminal, a first output terminal from which the first output signal is output, and a first output reference terminal coupled with the first input reference terminal at an equal potential; and
 a second rectifier circuit that rectifies a second high-frequency signal to generate a second output signal, the second rectifier circuit including a second input terminal from which the second high-frequency signal is input, a second input reference terminal, a second output terminal from which the second output signal is output, and a second output reference terminal coupled with the second input reference terminal at an equal potential, wherein
 the semiconductor switch, the first rectifier circuit, and the second rectifier circuit are integrated on a common board,
 on the board, the first output terminal of the first rectifier circuit is coupled to the first gate terminal of the semiconductor switch, and the first output reference terminal of the first rectifier circuit is coupled to the first source terminal of the semiconductor switch, and
 on the board, the second output terminal of the second rectifier circuit is coupled to the second gate terminal of the semiconductor switch, and the second output reference terminal of the second rectifier circuit is coupled to the second source terminal of the semiconductor switch.

2. The semiconductor device according to claim 1, wherein the semiconductor switch is a bidirectional switch in which conduction between the first source terminal and the second source terminal is controlled according to the first output signal input to the first gate terminal and the second output signal input to the second gate terminal.

3. The semiconductor device according to claim 1, wherein the first input reference terminal and the second input reference terminal are insulated from each other.

4. The semiconductor device according to claim 1, wherein
 the board includes a nitride semiconductor layer, and
 the semiconductor switch, the first rectifier circuit, and the second rectifier circuit are integrated on the nitride semiconductor layer.

5. The semiconductor device according to claim 1, wherein the semiconductor device is a horizontal device.

6. The semiconductor device according to claim 1, wherein
 the first rectifier circuit includes a first coupling capacitor, a first inductor, and a first diode, and
 the second rectifier circuit includes a second coupling capacitor, a second inductor, and a second diode.

7. The semiconductor device according to claim 6, wherein a cathode of the first diode is coupled to the first input terminal, an anode of the first diode is coupled to the first input reference terminal, a cathode of the second diode is coupled to the second input terminal, and an anode of the second diode is coupled to the second input reference terminal.

8. The semiconductor device according to claim 6, wherein
 the first rectifier circuit further includes a first capacitor and a first resistor coupled parallel to each other between the first output terminal and the first output reference terminal, and
 the second rectifier circuit further includes a second capacitor and a second resistor coupled parallel to each other between the second output terminal and the second output reference terminal.

9. The semiconductor device according to claim 6, wherein an inductance of the first inductor and an inductance of the second inductor are different from each other.

10. The semiconductor device according to claim 1, wherein a frequency of the first high-frequency signal and a frequency of the second high-frequency signal are different from each other.

11. The semiconductor device according to claim 1, wherein:
 the semiconductor switch is a first bidirectional switch;
 the semiconductor device further includes
  a second bidirectional switch that includes a third source terminal, a fourth source terminal, a third gate terminal, and a fourth gate terminal,
  a third bidirectional switch that includes a fifth source terminal, a sixth source terminal, a fifth gate terminal, and a sixth gate terminal,
  a third rectifier circuit that is coupled to the third source terminal and the third gate terminal of the second bidirectional switch,
  a fourth rectifier circuit that is coupled to the fourth source terminal and the fourth gate terminal of the second bidirectional switch,
  a fifth rectifier circuit that is coupled to the fifth source terminal and the fifth gate terminal of the third bidirectional switch, and
  a sixth rectifier circuit that is coupled to the sixth source terminal and the sixth gate terminal of the third bidirectional switch; and
 the first bidirectional switch, the second bidirectional switch, the third bidirectional switch, the first rectifier circuit, the second rectifier circuit, the third rectifier circuit, the fourth rectifier circuit, the fifth rectifier circuit, and the sixth rectifier circuit are integrated on the board.

12. The semiconductor device according to claim 11, further comprising:
 a common coupling section that connects with one of the first source terminal and the second source terminal of the first bidirectional switch, one of the third source terminal and the fourth source terminal of the second bidirectional switch, and one of the fifth source terminal and the sixth source terminal of the third bidirectional switch, wherein the first rectifier circuit, the second rectifier circuit, the third rectifier circuit, the fourth rectifier circuit, the fifth rectifier circuit, and the sixth rectifier circuit are integrated in a rectifier-circuit region on the board, and the first bidirectional switch and the second bidirectional switch are arranged side by side across the common coupling section, and the third bidirectional switch and the rectifier-circuit region are arranged side by side across the common coupling section.

13. A switching system comprising:
the semiconductor device according to claim 1;
a transmission circuit that modulates a high frequency wave according to an input signal to generate a high-frequency signal, and outputs the high-frequency signal; and
a resonance coupler that isolatedly transmits the high-frequency signal input from the transmission circuit while dividing the high-frequency signal into a first high-frequency signal and a second high-frequency signal, and outputs the first and second high-frequency signals to the semiconductor device.

14. A matrix converter comprising:
at least nine semiconductor devices including the semiconductor device according to claim 1;
an integrated transmission circuit into which at least three transmission circuits are integrated, each of the at least three transmission circuits modulating a high frequency wave according to an input signal to generate a high-frequency signal; and
an integrated insulator into which at least nine resonance couplers are integrated, each of the at least nine resonance couplers isolatedly transmitting the high-frequency signal input from the transmission circuit to output a first high-frequency signal and a second high-frequency signal to the semiconductor device, wherein
the at least nine semiconductor devices are driven according to at least nine input signals input to the integrated transmission circuit.

15. The matrix converter according to claim 14, wherein
each of the at least three transmission circuits generates three high-frequency signals based on three input signals,
each of the at least nine resonance couplers divides one high-frequency signal input from the integrated transmission circuit into two high-frequency signals and outputs the two high-frequency signals, and
each of the at least nine semiconductor devices is driven according to two high-frequency signals input from the integrated insulator.

* * * * *